Aug. 4, 1953 — W. K. GREENE — 2,647,633
FILTER CARTRIDGE
Filed May 6, 1948 — 2 Sheets-Sheet 1

INVENTOR
WILLIAM K. GREENE, DECEASED, BY
DOROTHEA R. GREENE
Administratrix of the estate of
William K. Greene, deceased
BY
Mason & Graham
ATTORNEYS Aug. 4, 1953   W. K. GREENE   2,647,633
FILTER CARTRIDGE Filed May 6, 1948   2 Sheets-Sheet 2

INVENTOR
WILLIAM K. GREENE, DECEASED, BY
DOROTHEA R. GREENE
Administratrix of the estate of
William K. Greene, deceased.

BY

*Mason & Graham*

ATTORNEYS

Patented Aug. 4, 1953

2,647,633

UNITED STATES PATENT OFFICE 2,647,633

FILTER CARTRIDGE

William K. Greene, deceased, late of Ontario, Calif., by Dorothea R. Greene, administratrix, Ontario, Calif.

Application May 6, 1948, Serial No. 25,475

4 Claims. (Cl. 210—134)

This invention has to do with oil filters for use in filtering the oil in internal combustion engines, and relates more particularly to a replaceable filtering cartridge for use in such filter devices.

This application is a continuation in part of his copending application for patent, Serial No. 673,956, filed June 3, 1946, now abandoned for Oil Filters.

Oil filters usually consist of an outer casing and a filtering cartridge suspended in the casing. The cartridge, through which the oil passes, contains various filtering agents. One of the principal filtering agents used in such cartridges in diatomaceous earth, which is a loosely packed granular material.

One of the chief shortcomings of prior art filter cartridges has been that the arrangement of the filtering media within the cartridge is such that, in passing therethrough, the oil tends to define channels or paths which permit the oil to pass through substantially unfiltered.

It is therefore an object of his present invention to provide a filtering cartridge for an oil filter wherein means are provided for preventing the oil from forming paths or channels through the filtering media.

Another object is to provide an oil filtering device which is unusually efficient in its filtering action.

How those and other objects which will hereinafter become apparent are attained will be understood from the following description of a presently preferred embodiment of the invention, for which purpose he has referred to the accompanying drawings, wherein.

Figure 1:
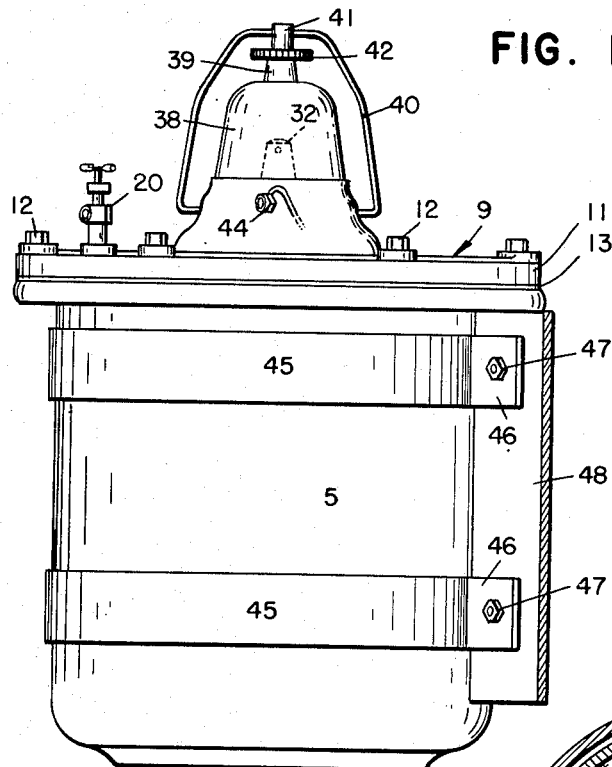
Fig. 1 is a side elevation.
Figure 5:
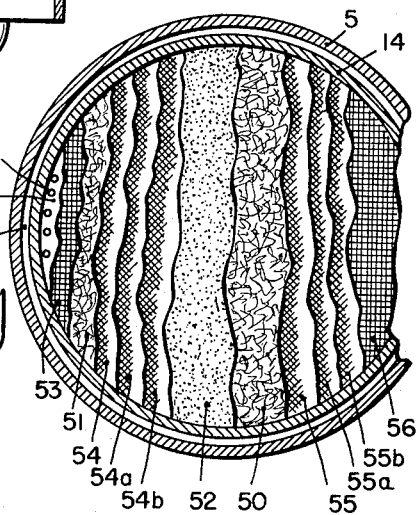
Fig. 5 is a plan section.
Figure 2:
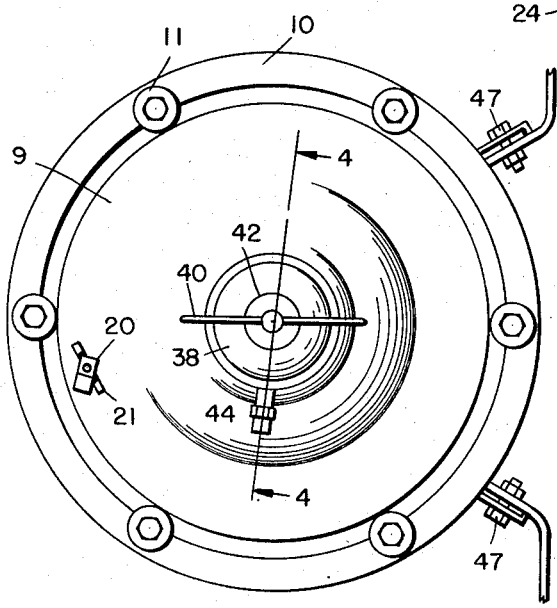
Fig. 2 is a top plan view.
Figure 3:
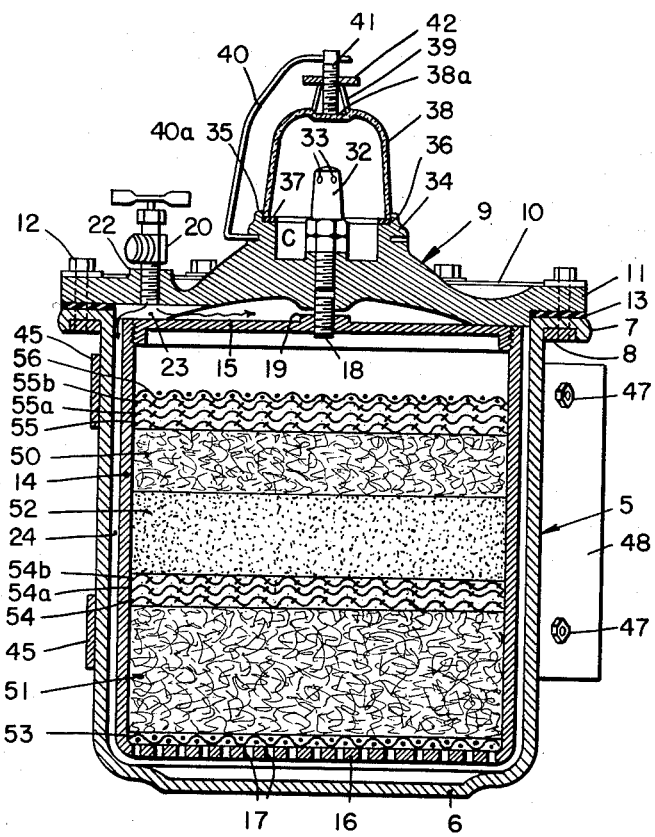
Fig. 3 is a medial cross section.
Figure 4:
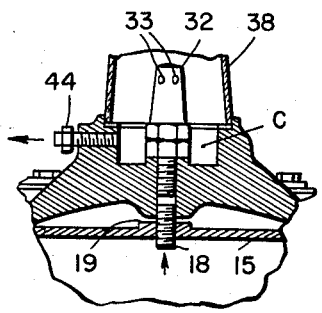
Fig. 4 is a section taken on line 4—4 of Fig. 2.

Referring now to the drawings, numeral 5 indicates a cylindrical receptacle or outer casing having an integral bottom wall 6 and being provided with a removable cover plate 9. The receptacle 5 has a top peripheral flange 7 reinforced by an annular cast iron insert 8.

The cover plate has an annular reinforcing bead 10 and a plurality of circumferentially spaced round bosses 11 centrally bored and threaded to receive bolts 12 for holding the cover plate on the flange 7, the bolts passing through the flange and insert 8.

A gasket 13 is preferably interposed between the cover plate and flange 7 to provide a fluid tight seal.

A cartridge casing 14 of cylindrical cross section and having a cover cap 15 threadedly mounted therein is suspended concentrically within receptacle 5 in the manner to be described, said casing being shorter and smaller in diameter than the receptacle so that its bottom end and side walls are spaced from the contiguous walls of the receptacle to provide an oil passing space 24. The bottom wall 16 of the casing is provided with oil passing perforations 17.

The casing 14 is suspended in the receptacle by a threaded nipple 18 which threads into an opening provided centrally through the relatively thickened wall portion 19 of the cap 15. Preferably the nipple holds the casing with its top portion adjacent its periphery abutting the somewhat domed cap 9 adjacent the periphery of the latter.

Oil to be filtered is forced by means old in the the art through a conduit, not shown, communicating with valve fitting 20. The latter valve is provided with a conventional valve structure actuated by a T handle 21. The fitting 20 is threaded through a boss 22 on the cover plate, opening into a radial slot 23 in the underside of the cover plate. The slot 23 passes oil from the valve into the space 24 between the side and bottom walls of the receptacle and casing, so that the oil is then forced upwardly through the perforations 17, through the filtering media within the cartridge casing to be described and thence out through the nipple 18 which forms a conduit through the top of the casing 14 and through cover cap 9 into a hollow fitting 32 and through radial ports 33 in the latter fitting.

Surrounding the center of the cover plate 9 there is an upstanding annular boss 34 presenting an annular flange 35 surrounding an annular shoulder 36 on the boss. A transparent inverted cup 38, preferably of glass, has its rim snugly fitting within the flange 35 against the shoulder 36, a gasket 37 being interposed between the rim and the shoulder.

The top of the cup has a medial recess 38a which forms a seat for the lower rim of a thimble 39.

To removably secure the cup 38 against the gasket 37, a bail 40 has its lower ends bent inwardly to form trunnions pivotally journaled in holes 40a in the boss 34. A stud 41 is attached to the top of the bail and is threaded to receive a nut 42 which adjustably bears against and holds down the thimble 39, which in turn clamps the cup 38 in position.

A fitting 44 is threaded through the boss 34 and communicates with the chamber C formed by the cup 38 and the annular boss 34, the fitting being threaded to receive a conduit, not shown, for conducting the filtered oil back to the crankcase of the motor.

Straps 45 encircle the receptacle, the straps being bent at their ends to form flanges 46 bored to receive attaching bolts 47 for securing the straps to a mounting bracket 48. The bracket is in turn mounted in an appropriate position beneath the hood of an automobile.

The principal feature of his present invention resides in the arrangement and composition of the filtering media within the cartridge casing 14, which will now be described.

It was his preference to provide an upper layer 50 and a lower layer 51 of a loosely packed filtering material, such as machine composition waste, which is a loosely packed fibrous material commonly used in filters, and between those two layers he has provided a layer 52 of a granular filtering material, preferably diatomaceous earth.

A wire mesh screen 53 may be interposed between the bottom layer 51 and the bottom wall of the cartridge casing.

Multiple superimposed layers 54, 54a and 54b, preferably three in number, of a soft woven cloth fabric such as cotton muslin, are interposed between the layer 52 and the bottom layer 51. Also, multiple superimposed layers 55, 55a and 55b of a light fabric are preferably placed against the top of layer 50. Over the topmost of the latter layers of fabric he preferably placed a stiff wire mesh screen 56 to prevent the peripheral edge portions of the layers of filtering media from being forced upwardly by the oil pressure.

Oil, in passing through the granular layer 52 under pressure, ordinarily tends to form well defined paths or channels which result in that layer becoming relatively ineffective as a filtering element despite the fact that it is intended as the principal filtering element. He found that by using, immediately beneath the layer 52, the multiple layers of soft cloth fabric, the fabric layers not only perform some filtering action themselves but, most important, they so distribute the fluid into numerous minute streams that paths or channels are not formed through the granular material. By actual comparative tests he has found that because of this advantageous feature of his filter cartridge, his cartridge is at least thirty per cent more efficient in filtering oil than any other filter in use.

The fabric layers 55, 55a and 55b serve to finally collect any foreign material from the oil which might escape through the filter layers therebeneath.

What is claimed is:

1. An oil filtering cartridge comprising a casing having an oil inlet through one of its ends and an oil outlet through its opposite end, a plurality of layers of filtering material in the casing between said inlet and outlet, one of said layers being of a granular filtering material, and means for preventing oil passing through the casing from forming defined paths through said last named layer comprising a multiplicity of superimposed sheets of soft woven cloth fabric positioned in loose face-to-face contact with each other on that side of said last named layer towards said inlet.

2. An oil filtering cartridge comprising a casing having an oil inlet through one of its ends and an oil outlet through its opposite end, a plurality of layers of filtering material in the casing between said inlet and outlet, one of said layers being of diatomaceous earth, and means for preventing oil passing through the casing from forming defined paths through said last named layer comprising a multiplicity of superimposed sheets of soft woven cloth fabric positioned in loose face-to-face contact with each other on that side of said last named layer towards said inlet.

3. An oil filtering cartridge comprising a casing having an oil inlet through one of its ends and an oil outlet through its opposite end, a filling of oil filtering media in the casing, said media including end layers of loosely packed machine composition waste, an intermediate layer of diatomaceous earth and a plurality of sheets of soft woven cloth fabric between the latter layer and the next layer towards the inlet; said latter sheets being superimposed one on the other in unstretched condition.

4. An oil filtering cartridge comprising a casing having an oil inlet through one of its ends and an oil outlet through its opposite end, a layer of granular filtering material in the casing between said inlet and outlet, and means for preventing oil passing through said filtering material from forming defined paths in the filtering material comprising two groups of soft woven fabric sheets disposed transversely of the casing, one group above and one group below said layer of filtering material, each of said groups comprising a plurality of said sheets disposed loosely in face-to-face contact with each other.

DOROTHEA R. GREENE,
*Administratrix of the estate of William K. Greene, deceased.*

References Cited in the file of this patent

UNITED STATES PATENTS

| Number | Name | Date |
| --- | --- | --- |
| 1,201,302 | Jayne | Oct. 17, 1916 |
| 1,698,600 | McMachen et al. | Jan. 8, 1929 |
| 1,727,554 | Millard | Sept. 10, 1929 |
| 1,730,581 | McMachen et al. | Oct. 8, 1929 |
| 2,014,445 | Miller | Sept. 17, 1935 |
| 2,051,126 | Baxter et al. | Aug. 18, 1936 |
| 2,073,442 | Briggs | Mar. 9, 1937 |
| 2,388,668 | Carter | Nov. 13, 1945 |